(12) United States Patent
Kammler et al.

(10) Patent No.: US 6,167,677 B1
(45) Date of Patent: Jan. 2, 2001

(54) TUBULAR BAGGING MACHINE

(75) Inventors: Roman Kammler, Worms; Walter Baur, Gruendau, both of (DE)

(73) Assignee: Rovema Verpackungsmaschinen GmbH, Fernwald (DE)

( * ) Notice: Under 35 U.S.C. 154(b), the term of this patent shall be extended for 0 days.

(21) Appl. No.: 09/276,234

(22) Filed: Mar. 25, 1999

(30) Foreign Application Priority Data

Mar. 26, 1998 (DE) ................................................ 198 13 215

(51) Int. Cl.[7] .............................. B65B 9/20; B65B 51/30; B65B 57/10
(52) U.S. Cl. .................................. 53/75; 53/551; 53/374.8
(58) Field of Search ................................. 53/75, 551, 552, 53/374.5, 374.8

(56) References Cited

U.S. PATENT DOCUMENTS

| | | |
|---|---|---|
| 3,778,588 | 12/1973 | Bishel . |
| 3,905,174 | 9/1975 | Heisler . |
| 3,925,139 * | 12/1975 | Simmons ................................... 53/75 |
| 4,348,851 * | 9/1982 | Prakken ..................................... 53/75 |
| 4,807,426 | 2/1989 | Smith . |
| 4,968,867 | 11/1990 | Banzai et al. . |
| 5,056,296 | 10/1991 | Ross et al. . |
| 5,062,253 * | 11/1991 | Bacon et al. ............................. 53/551 |
| 5,117,612 * | 6/1992 | Keim et al. .............................. 53/551 |
| 5,147,491 * | 9/1992 | Thomas et al. ............................ 53/75 |
| 5,191,750 * | 3/1993 | Kammler ................................. 53/551 |
| 5,279,098 | 1/1994 | Fukuda . |
| 5,379,574 | 1/1995 | Fischer et al. . |
| 5,551,206 * | 9/1996 | Fukuda ...................................... 53/75 |
| 5,571,370 | 11/1996 | Selberg et al. . |
| 5,575,137 * | 11/1996 | Metz et al. .............................. 53/552 |
| 5,836,136 * | 11/1998 | Highberger ............................. 53/551 |
| 5,966,909 | 10/1999 | Kammler et al. . |

FOREIGN PATENT DOCUMENTS 0 469 105B1   10/1993   (EP) .

* cited by examiner

*Primary Examiner*—John Sipos
(74) *Attorney, Agent, or Firm*—Flynn, Thiel, Boutell & Tanis, P.C.

(57) ABSTRACT

In a tubular bagging machine with two cross-sealing jaws 1, 2, which are movable toward one another and thereby cross-weld a foil tube, product that moves between the cross-sealing jaws 1, 2, interferes with the cross seam, and results in a leaky cross-seam of a tubular bag. In order to reliably recognize entrapped product 10, it is suggested to measure the performance resistance of the servomotor on the cross-sealing jaws 1, 2, which are moved by a servomotor drive 4, in order to determine product entrapment. The machine controller 8 can additionally receive from the drive 4 a value for the jaw position, which position value corresponds to a desired momentary jaw pressure. A product entrapment is determined from a high or measured performance resistance value from the desired value. A reliable product entrapment recognition is achieved through the use of the light-metal cross-sealing jaw.

20 Claims, 3 Drawing Sheets

TUBULAR BAGGING MACHINE

FIELD OF THE INVENTION

The invention relates to a tubular bagging machine, and more particularly to a tubular bagging machine with two cross-sealing jaws, which can be moved toward one another and thereby cross-weld a foil tube, a mechanism for moving the cross-sealing jaws, a transporting device for moving the foil tube and a longitudinal welding device for the foil tube, a filling device, a separating device for separating individual, filled tubular bags, a device for measuring the pressure of the cross-sealing jaws, and a machine control device.

BACKGROUND OF THE INVENTION

Such a tubular bagging machine is known from the EP-OS 0 469 105. The path of the cross-sealing jaws is in this machine fixedly specified by a machine controller. The cross-sealing jaws weld a foil tube transversely with respect to its transporting direction. The foil tube is welded by the cross-sealing jaws to create a cross-sealing seam after a product portion is fed into the foil tube.

It can happen in the case of certain product type that a product portion is not sufficiently compactly fed into the foil tube and therefore extends into an area of the foil tube to be cross-welded. In particular, relatively light, large-surface product particles like potato chips have the tendency to sail during free fall and thus result in a wide product swarm, the compactness of which can be very different from one product portion to the next product portion.

Product entrapped in a cross-sealing seam can result in a leaky tubular bag. Such a tubular bag is then removed from a packaging system. In particular in the case of smaller product entrapments in a cross-sealing seam it can additionally happen that the entrapment is not noticed and the defective tubular bag is forwarded for further packaging.

SUMMARY OF THE INVENTION

The basic purpose of the invention is to develop a tubular bagging machine of the above-described type in such a manner that large and small product entrapments in a cross-seam can be reliably recognized, and that upon recognition of such a product entrapment a signal can be produced.

The purpose is attained by providing a tubular bagging machine which has a device for recognizing product enclosed between the cross-sealing jaws, this device includes the cross-sealing jaws and the drive, the drive being a servomotor, the cross-sealing jaws consisting of a light metal, and has evaluating electronics for evaluating the performance characteristics of the servomotor and cross-sealing jaws and forwards these values dependent on the jaw position to the machine controller.

It is achieved with the tubular bagging machine of the invention that even small product entrapments in a cross-sealing seam can be reliably recognized, and that upon recognition of a product entrapment a signal can be produced.

The recognition of the product entrapment is done through a further evaluation of the performance resistance (characteristics) of the servomotor for driving the cross-sealing jaws and a comparison of this value with a desired value at the same jaw position at which the performance resistance was evaluated. If the momentary performance resistance is too high, a product entrapment in a cross-sealing seam to be welded and thus a product entrapment between the cross-sealing jaws can be determined. A measured performance resistance, which is too high, results in a reaction of the machine control or initially only in an error alarm. It is sufficient to evaluate one single momentary performance resistance. However, it is also possible to evaluate a plurality of momentary performance resistance. Several measurements of the momentary performance resistance during a cross-welding operation increase the precision of determining if a product entrapment has occurred.

Since the cross-sealing jaws consist of a light metal, they have in comparison to the commonly used steel clearly reduced dimensions, and the exactness for the measuring and evaluating of the performance resistance of the servomotor are clearly more exact than they would be if steel was used. A product entrapment recognition can only through this structure occur in a reliable manner.

Further, advantageous developments of the tubular bagging machine of the invention are below described.

A compact electronic construction is achieved when the evaluating electronics is integrated into the machine controller. Whereas, ease of servicing the tubular bagging machine is improved when the evaluating electronics is arranged separately from the machine controller.

A further advantage is achieved when the tubular bagging machine is a vertical tubular bagging machine since in the case of a vertical tubular bagging machine the danger of a product entrapment is greater than in a horizontal tubular bagging machine.

When the cross-sealing jaws are part of a rotating, continuously working jaw system, wherein the cross-sealing jaws rotate in opposite directions about respective axes, which extend parallel to one another, then the packaging speed can be greater than in a discontinuously functioning jaw system since a jaw standstill does not happen. In principal, however, it is possible to utilize the invention both in a continuously and also in a discontinuously working jaw systems.

The sensitivity regarding a product entrapment recognition is clearly increased when the cross-sealing jaw or a movable carrier of the cross-sealing jaw is made of a light metal, for example magnesium alloy. A magnesium alloy has a density of 1.7 kg/dm$^3$ which is clearly a lower density than steel, the density of which lies between 6.3 and 8.1 kg/dm$^3$. Thus, the moved mass of a light metal cross-sealing jaw or carrier are clearly reduced when using a magnesium alloy. Since the sensitivity is increased at a decreasing mass, a very exact and thus also reliable product entrapment recognition can occur through the use of the magnesium alloy.

The thermal conductivity of the magnesium alloy (170 W/mK) is clearly higher than steel (15 to 45 W/mK) so that in addition the cross-sealing jaws have a clearly more exact and more even temperature than steel jaws along their sealing surfaces.

The momentary position of a cross-sealing jaw can be recognized by the servomotor through the operating time of the servomotor, which clearly simplifies recognizing the position of the cross-sealing jaws.

When both values of the jaw drive for the momentary jaw position and also corresponding values of the evaluating electronics are fed to the machine controller, then the machine controller can start a reaction to a product entrapment in a cross-sealing seam, for example, a bag expulsion operation, and thus the removal of the defective tubular bag from the further packaging processes.

When sensitivity for a product entrapment recognition is programmed in the evaluating electronics as a tolerable deviation of an actual measured value from a desired value for a value stored in the evaluating electronics, then the sensitivity for the recognition of a product entrapment can be changed. This is useful, for example, for changed machine parameters.

It is of interest in most cases that a product entrapment recognition is supposed to occur only within a certain jaw spacing since only at this jaw spacing, which lies, for example, near zero, a measurable increase of the jaw pressure occurs and is measured as the performance resistance. It is then advantageous when the jaw spacing is programmed in a range within which a product entrapment recognition occurs, in particular when a measurement of the momentary jaw pressure occurs at closed or almost closed cross-sealing jaw positions. The difference between actual value and desired value is in the case of a product entrapment the greatest in these positions.

In case of an error alarm because of a recognized product entrapment a machine stop can occur immediately so that the cause of the product entrapment can be determined and prevented in future packaging operations.

BRIEF DESCRIPTION OF THE DRAWINGS

The invention will be discussed in greater detail hereinafter in connection with one exemplary embodiment and the drawings, in which.

DETAILED DESCRIPTION

Figure 1:
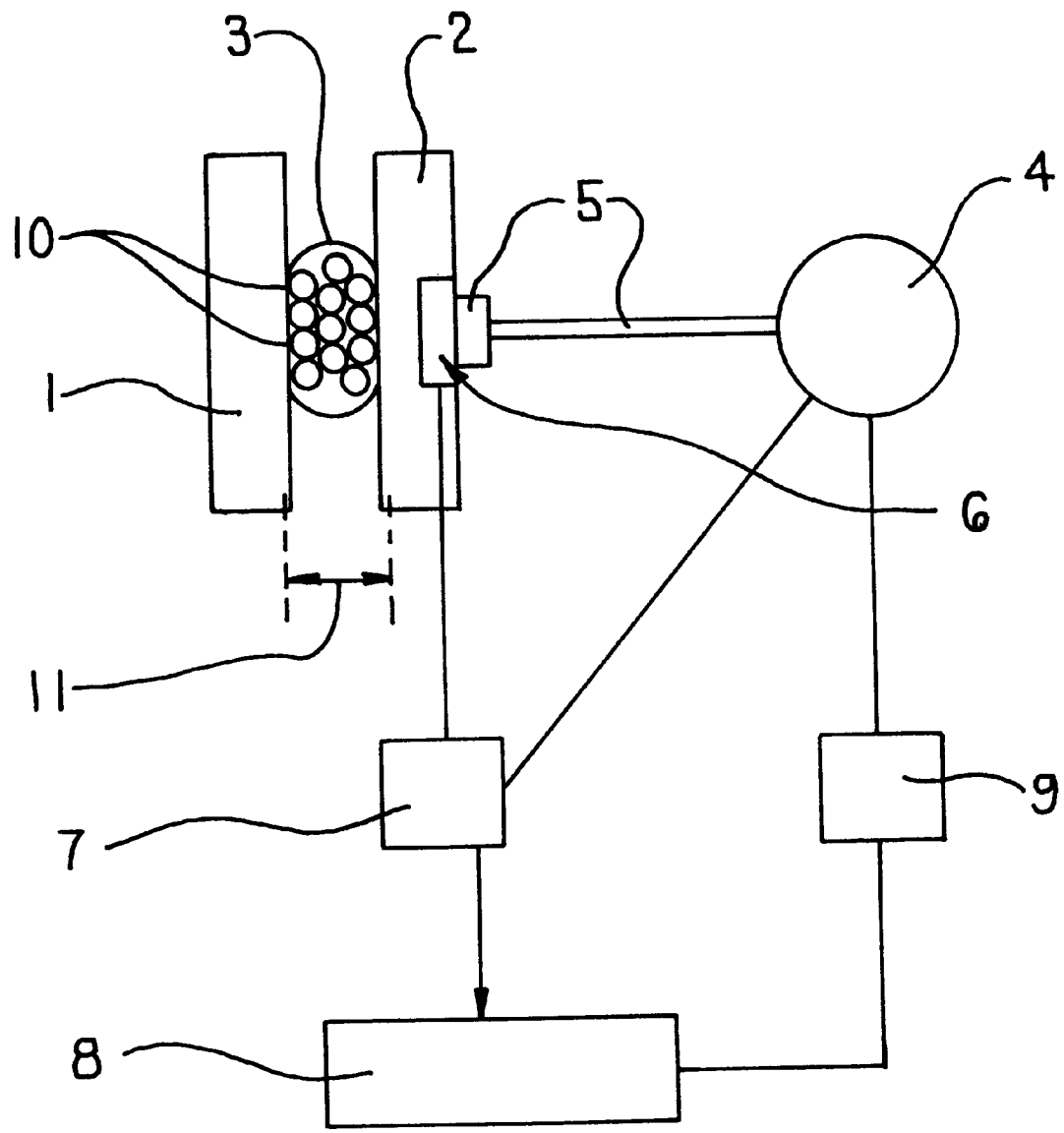
FIG. 1 is a schematic illustration of the operating principle of a recognition of product within a foil tube, which is supposed to be welded between two cross-sealing jaws of a vertical tubular bagging machine, which cross-sealing jaws are supposed to be moved toward one another, with a servomotor for movement of a cross-sealing jaw and for measuring the momentary jaw pressure through the performance resistance of the servomotor in order to determine a product entrapment between the cross-sealing jaws.
Figure 2:
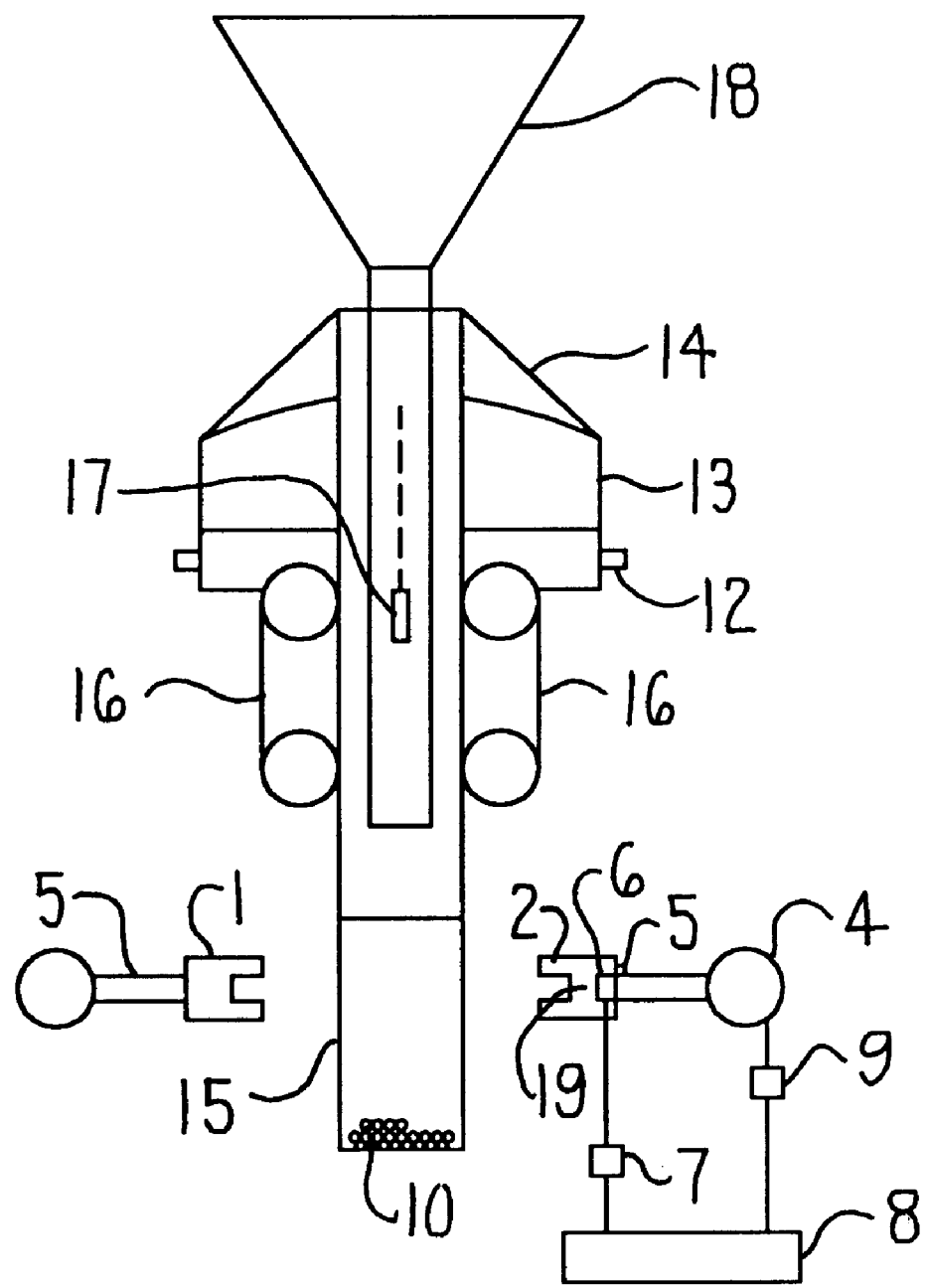
FIG. 2 is a schematic illustration of a vertical tubular bagging machine.

Illustrated in FIG. 2 are a storage roller 12 having a foil strip 13 thereon, a forming device 14 shaping the foil strip into a foil tube 15, a transporting device 16 for moving the foil strip 13 and tube 15, a longitudinal welding device 17 for welding the foil tube 15, a filling device 18 inserting product 10 into the foil tube, and a separating device 19 for separating individual, filled tubular bags from the foil tube, which are commonly known structural elements. Examples of these tubular bagging elements can be found in U.S. Pat. Nos. 5,191,750, 5,203,145, 5,575,137, 5,791,129 and 5,832,700, all having the same assignee as the present application and being incorporated herein by reference.

Two cross-sealing jaws 1, 2 are moved toward one another in a tubular bagging machine in order to cross-weld (transversely weld) a foil tube 3 provided between the cross-sealing jaws. The cross-sealing jaws are moved by means of a drive 4 and a movable link mechanism 5.

Figure 3:
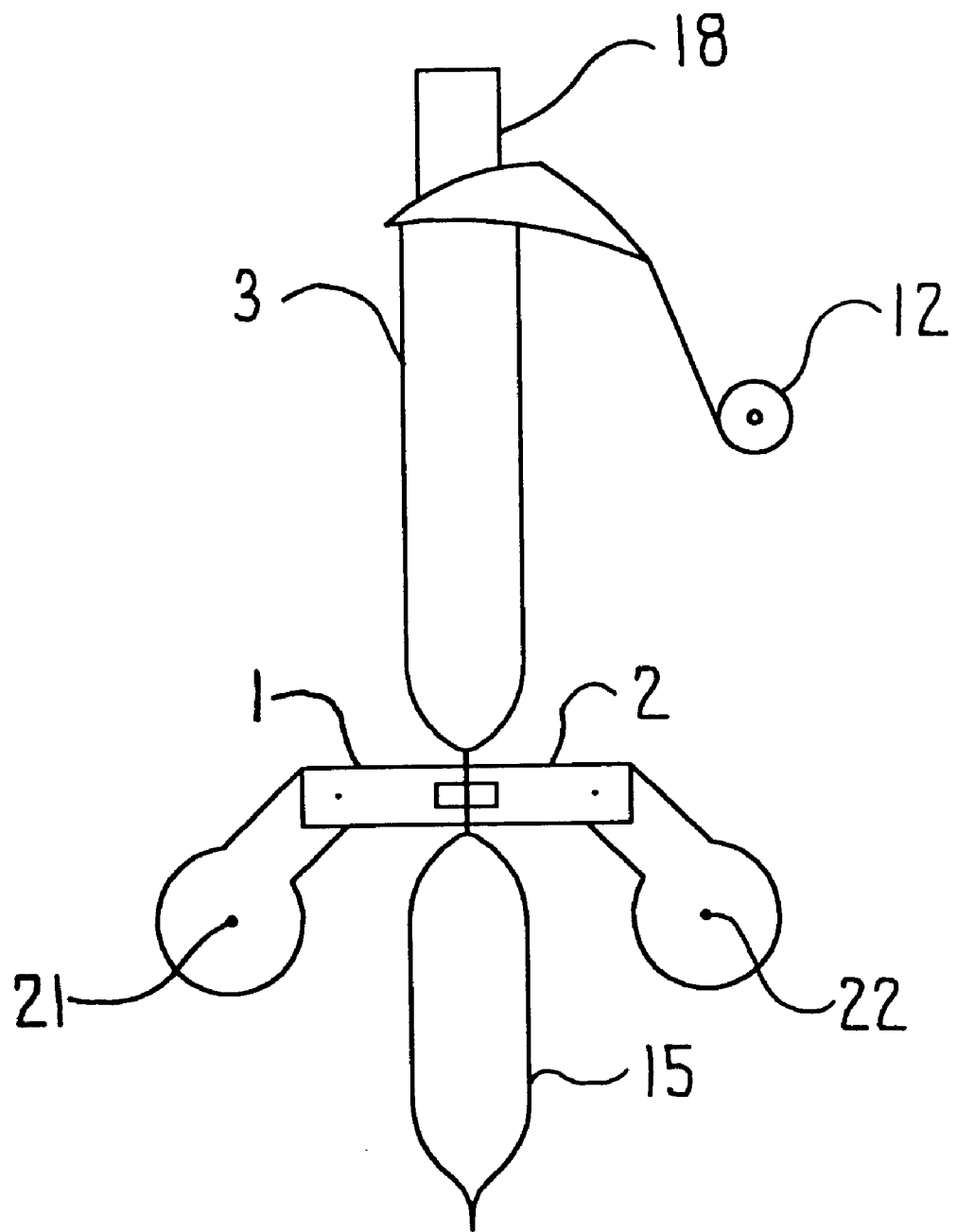
FIG. 3 is a schematic illustration of a rotating sealing jaw system.

The tubular bagging machine is a vertical tubular bagging machine. Its cross-sealing jaws 1, 2 are part of a rotating jaw system, whereby the cross-sealing jaws 1, 2 rotate in opposite direction about axes 21, 22, which extend parallel to one another, and are driven by the drive 4 about the axes 21, 22 (FIG. 3).

A measuring device 6 for measuring the momentary performance resistance of the drive 4 is provided on at least one cross-sealing jaw 2 which is made of a magnesium alloy. The measuring device 6 measures the pressure applied by drive 4 through link 5 to the sealing jaw 2 to press the bag 3 and any entrapped product 10 to seal the bag ends. The measuring device 6 is connected to a machine controller 8 through a separate evaluating electronics 7, for example device 6 being electrically connected to evaluating electronics 7 and the evaluating electronics 7 being electrically connected to the machine controller 8.

The drive 4 for the cross-jaw movement is also connected to the machine control 8 through a drive amplifier 9. The drive 4 is a servomotor. The drive 4 is also connected to the evaluating electronics 7 to communicate the current jaw position thereto.

The tubular bagging machine is operated such that the measurement of the momentary performance resistance (jaw pressure) of the servomotor and hence the sealing jaws 1, 2 occurs dependent on momentary jaw position. The drive 4 isochronously supplies position values for the momentary jaw position with the measured performance resistance determined by the measuring device 6 to the evaluating electronics 7. The evaluating electronics 7 stores the desired performance resistance for each position of the sealing jaws. The evaluating electronics 7 compares the measured performance resistance to the desired resistance for the position of the sealing jaw. If the measured resistance exceeds the desired resistance, then the evaluating electronics 7 signal the machine controller 8 that a product entrapment has occurred.

The unintentionally entrapped product 10 is recognized such that the momentary performance resistance is higher during pressing of the product 10 than a specified, predetermined threshold value. The threshold value is slightly higher than the corresponding jaw pressure at the same jaw position without entrapped product.

The sensitivity for the product entrapment recognition was programed in as a tolerable deviation of the actual value from the desired value for the measured value of the performance resistance of the servomotor. The value measured by the measuring device 6, i.e. the pressure at one of the jaws 2 acting on the bag 3, is evaluated by the evaluating electronics 7. Thereafter, the comparison result from the evaluating electronics 7 is forwarded to the machine controller 8.

Prior to using the tubular bagging machine jaw, spacing 11 was programmed in the evaluating electronics or machine controller, within which a product entrapment recognition is supposed to occur. A product recognition occurs with a relatively high exactness only for a jaw spacing smaller or equal to the programmed jaw spacing 11.

By recognizing the product 10 existing between the cross-sealing jaws 1, 2, unrecognized product entrapment in a cross-sealing seam of a tubular bag and a leaky tubular bag are avoided. The tubular bag with the product entrapment is removed from the packing line after a product entrapment signal is produced. During standstill or while the tubular bagging machine continues to run, it is possible to eliminate the cause of the product entrapment. The exactness of the product recognition is very high since both the cross-sealing jaw 2 and also the mechanism 5, which is a carrier, are made of a magnesium alloy. With this even relatively small changes in the performance resistance (jaw pressure) can be reliably recognized.

Although a particular preferred embodiment of the invention has been disclosed in detail for illustrative purposes, it will be recognized that variations or modifications of the disclosed apparatus, including the rearrangement of parts, lie within the scope of the present invention.

We claim:

1. A tubular bagging machine comprising:
    a longitudinal welding device for longitudinally welding a foil tube;
    a transporting device for moving the foil tube;
    a filling device for providing product into the foil tube;
    two cross-sealing jaws made of a light metal and capable of movement toward one another for cross-welding a foil tube;
    a drive mechanism for moving said cross-sealing jaws to seal the bags and for continuously communicating a current position of at least one of said jaws during its movement;
    a machine controller for controlling said drive mechanism;
    a measuring device for measuring pressure of at least one of said cross-sealing jaws; and
    evaluating electronics for receiving the current position of said jaw and continuously evaluating the measured pressure from said measuring device with a desired pressure dependent on the current position of said cross-sealing jaw, said evaluating electronics providing a product entrapment signal to the machine controller when the measured pressure exceeds the desired pressure.

2. The tubular bagging machine according to claim 1, wherein a spacing between said cross-sealing jaws in a closed cross-sealing position is programmed into said evaluating electronics.

3. The tubular bagging machine according to claim 1, wherein said evaluating electronics stores the desired pressure for each position of said cross-sealing jaw.

4. The tubular bagging machine according to claim 1, wherein said drive mechanism is directly connected to said evaluating electronics to communicate the current position of said cross-sealing jaws.

5. The tubular bagging machine according to claim 1, wherein said evaluating electronics is integrated into said machine controller.

6. The tubular bagging machine according to claim 1, wherein said evaluating electronics is separate from said machine controller.

7. The tubular bagging machine according to claim 1, wherein the tubular bagging machine is a vertical tubular bagging machine.

8. The tubular bagging machine according to claim 7, wherein said cross-sealing jaws are part of a rotating jaw system, whereby said cross-sealing jaws rotate in opposite directions about respective axes, which extend parallel to one another.

9. The tubular bagging machine according to claim 8, wherein said cross-sealing jaws consist of a magnesium alloy.

10. The tubular bagging machine according to claim 9, wherein a movable carrier of said cross-sealing jaws consists of a magnesium alloy.

11. The tubular bagging machine according to claim 1, wherein said cross-sealing jaws are part of a rotating jaw system, whereby said cross-sealing jaws rotate in opposite directions about respective axes, which extend parallel to one another.

12. The tubular bagging machine according to claim 1, wherein said cross-sealing jaws consist of a magnesium alloy.

13. The tubular bagging machine according to claim 1, wherein a movable carrier of said cross-sealing jaws consists of a magnesium alloy.

14. A tubular bagging machine comprising:
    a longitudinal welding device for longitudinally welding a foil tube;
    a transporting device for moving the foil tube;
    a filling device for providing product into the foil tube;
    two cross-sealing jaws consisting of a light metal and capable of movement toward one another for cross-welding the foil tube;
    a drive mechanism for moving said cross-sealing jaws to seal the bags and for continuously communicating a current position of at least one of said cross-sealing jaws during its movement;
    a machine controller for controlling said drive mechanism;
    a measuring device for measuring resistance of said cross-sealing jaws; and
    evaluating electronics for receiving the current position of said cross-sealing jaw and continuously evaluating the measured resistance from the measuring device with a desired performance resistance that is dependent on the current position of said jaw, said evaluating electronics providing a product entrapment signal to said machine controller when the measured resistance exceeds the desired performance resistance.

15. The tubular bagging machine according to claim 14, including a linkage connected to said cross-sealing jaws, said linkage consisting of a magnesium alloy.

16. The tubular bagging machine according to claim 14, including a movable carrier for said cross-sealing jaws, said movable carrier and said cross-sealing jaws consisting of a magnesium alloy.

17. The tubular bagging machine according to claim 14, wherein a spacing between said cross-sealing jaws in a closed cross-sealing position is programmed into said evaluating electronics.

18. The tubular bagging machine according to claim 14, wherein said evaluating electronics stores the desired performance resistance for each position of said cross-sealing jaw.

19. The tubular bagging machine according to claim 14, wherein said drive mechanism is directly connected to said evaluating electronics to communicate the current position of said cross-sealing jaw.

20. The tubular bagging machine according to claim 14, including a separating device for separating individual, filled tubular bags from the foil tube.

* * * * *